United States Patent [19]

Iuchi

[11] Patent Number: 5,396,941
[45] Date of Patent: Mar. 14, 1995

[54] RADIAL TIRE WITH SPIRALLY WOUND BAND HAVING VARIED WINDING PITCH

[75] Inventor: Munenori Iuchi, Kobe, Japan

[73] Assignee: Sumitomo Rubber Industries, Ltd., Kobe, Japan

[21] Appl. No.: 692,982

[22] Filed: Apr. 29, 1991

[30] Foreign Application Priority Data

May 2, 1990 [JP] Japan ................... 2-116512

[51] Int. Cl.⁶ .................... B60C 9/18; B60C 9/20; B60C 9/26
[52] U.S. Cl. ................... 152/527; 152/529; 152/531; 152/533; 152/537; 156/117
[58] Field of Search ............. 152/533, 531, 527, 537, 152/529; 156/117

[56] References Cited

U.S. PATENT DOCUMENTS

| | | |
|---|---|---|
| 3,991,803 | 11/1976 | Praszek . |
| 4,484,965 | 11/1984 | Wagner et al. . |
| 4,869,307 | 9/1989 | Bormann et al. . |
| 4,987,938 | 1/1991 | Ushikubo et al. ........ 152/533 X |
| 5,076,336 | 12/1991 | Watanabe et al. ......... 152/533 |

FOREIGN PATENT DOCUMENTS

| | | |
|---|---|---|
| 3629955 | 3/1988 | Germany . |
| 3639142 | 5/1988 | Germany ............ 152/537 |
| 61-15004 | 1/1986 | Japan . |
| 62-203803 | 9/1987 | Japan . |
| 1279803 | 11/1989 | Japan . |

OTHER PUBLICATIONS

*Mechanics of Pneumatic Tires,* ed. Samuel Clark: US Dept. of Transportation, Aug. 1981, pp. 219–220.

*Primary Examiner*—Adrienne Johnstone

[57] ABSTRACT

A belted radial tire has a belt composed of a breaker and a band, the breaker disposed radially outside a carcass and comprising at least two plies of cords inclined with respect to the tire equator so that the cords in each ply cross the cords in the next ply, the band disposed on the radially outside of the breaker and composed of a strip of rubberized parallel organic fiber cords which strip is wound spirally and continuously around the breaker from its one edge to the other edge, the number of the organic fiber cords in the strip being in the range of 10 to 25, the winding pitches of the strip changed in the axial direction of the tire so that the pitches are greater in a central region of the breaker than side regions, the pitches in the side regions being substantially a half of the strip width, and the pitches in the central region being not less than the strip width.

4 Claims, 7 Drawing Sheets

RADIAL TIRE WITH SPIRALLY WOUND BAND HAVING VARIED WINDING PITCH

The present invention relates to a belted radial ply tire, which is improved in Radial Runout (RRO) and is able to improve productivity.

BACKGROUND OF THE INVENTION

Usually, a radial tire is provided with a belt reinforcement comprising a breaker A and a band B, wherein the band cords are generally laid in parallel with the circumferential direction of the tire, and on the other hand, the breaker cords are inclined with respect to the circumferential direction. Such belt reinforcements are shown in FIGS. 9–11. FIG. 9 shows a full band B composed of a full width ply. FIG. 10 shows an edge band B composed of a pair of edge plies. FIG. 11 shows a combination band B composed of a full width ply b1 and a pair of edge plies b2.

The edge plies are effective for increasing the hooping force at the breaker edges, and accordingly effective for preventing ply edge looseness and separation.

Usually, such a band ply is formed by winding a ply material having the same width as its finishing width, around the carcass, and the ends of the ply are overlapped each other at a certain length as shown in FIG. 12. Accordingly, the thickness and rigidity are increased at the joint J, and RRO (Radial Runout) is increased, and further, the tire uniformity is disturbed.

In order to solve those problems a jointless band may be used, but as shown in FIG. 16, to form an edge ply at each edge of a breaker, when a strip T is wound separately at each breaker edge, since the number of the windings or turns in each ply is small and the both ends of the strip are free, the wound strip is liable to be loosened and shifted during a tire vulcanizing process by the increased cord tension, and accordingly the ply has an uneven thickness distribution to increase RRO, and the tire uniformity is disturbed.

On the other hand, various types of jointless bands have been proposed.

In order to form a band like the above-mentioned full width band B in FIG. 9, Japanese Utility-Model Publication (JITSUYO-KOKAI) No. 61-15604 discloses a band B shown in FIG. 13, wherein a strip T is wound spirally at regular pitches from one edge to the other edge of a breaker, while slightly overlapping the adjacent edges thereof. Accordingly, the hoop effect is not enhanced at the breaker edge regions at which a strong hooping force is required.

In Japanese Patent Publication (KOKAI) No. 62-203803, a band B having a double layered structure at the edge of a breaker A like the band B shown in FIG. 11 is disclosed, wherein a strip T including reinforcing cords of 1 to 8 in number is wound, while traversing a breaker A as shown in FIG. 14. However, the traversing direction is changed at least twice as indicated by an arrow to wind the strip around the previously wound portion thereof. Therefore, it becomes hard for the band to obtain a dimensional accuracy and a positional accuracy, and further the productivity is lowered.

Further, the allowed Japanese Patent Publication (KOUKOKU) No. 1-278803 discloses a band B also formed by winding a strip T around a breaker A, wherein the strip is overlapped as shown in FIG. 15. In a central region, the overlap is 50% of the strip width and the overlap is increased to 75% in side regions. Accordingly, the band has a double layered structure even in the central region, which results in an excessive increase in the hooping force in the central region as well as a decrease in cornering power. Further, the tire weight increases.

SUMMARY OF THE INVENTION

It is therefore, an object of the present invention to provide a radial tire having a belt reinforcement comprising a breaker and a band having edge piles, in which the above-mentioned problems, especially problems of RRO and uniformity are solved.

According to one aspect of the present invention, a radial tire comprises a carcass extending between bead portions through sidewall portions and a tread portion and having at least one ply of radially arranged cords turned up around bead cores, and a belt disposed radially outside the carcass and inside the tread and composed of a breaker and a band, the breaker disposed on the radially outside of the carcass and comprising at least two plies of cords inclined with respect to the tire equator so that the cords in each ply cross the cords in the next ply, the band disposed on the radially outside of the breaker and composed of a strip of rubberized parallel organic fiber cords which strip is wound spirally and continuously around the breaker from one edge to the other edge of the breaker, the number of the organic fiber cords In the strip being in the range of 10 to 25, the winding pitches of the strip, the distance between corresponding parts of adjacent strip windings, change in the axial direction of the tire so that the pitches are greater in a central region of the breaker than side regions, and the pitches in the side regions being substantially a half of the strip width.

the pitches in the central region being not less than the strip width.

To make an edge band like the belt B shown in FIG. 10, the winding pitches in the central region are set at such wider pitches that spaces of 30 to 100 mm are formed between the axially adjacent edges of the wound strip. To make a combination band like the belt B shown in FIG. 11, the winding pitches in the central region are set to be equal to the width of the strip.

BRIEF DESCRIPTION OF THE DRAWINGS

Embodiments of the present invention will now be described in detail with reference to the accompanying drawings, in which.

DETAILED DESCRIPTION OF THE INVENTION

Figure 1:
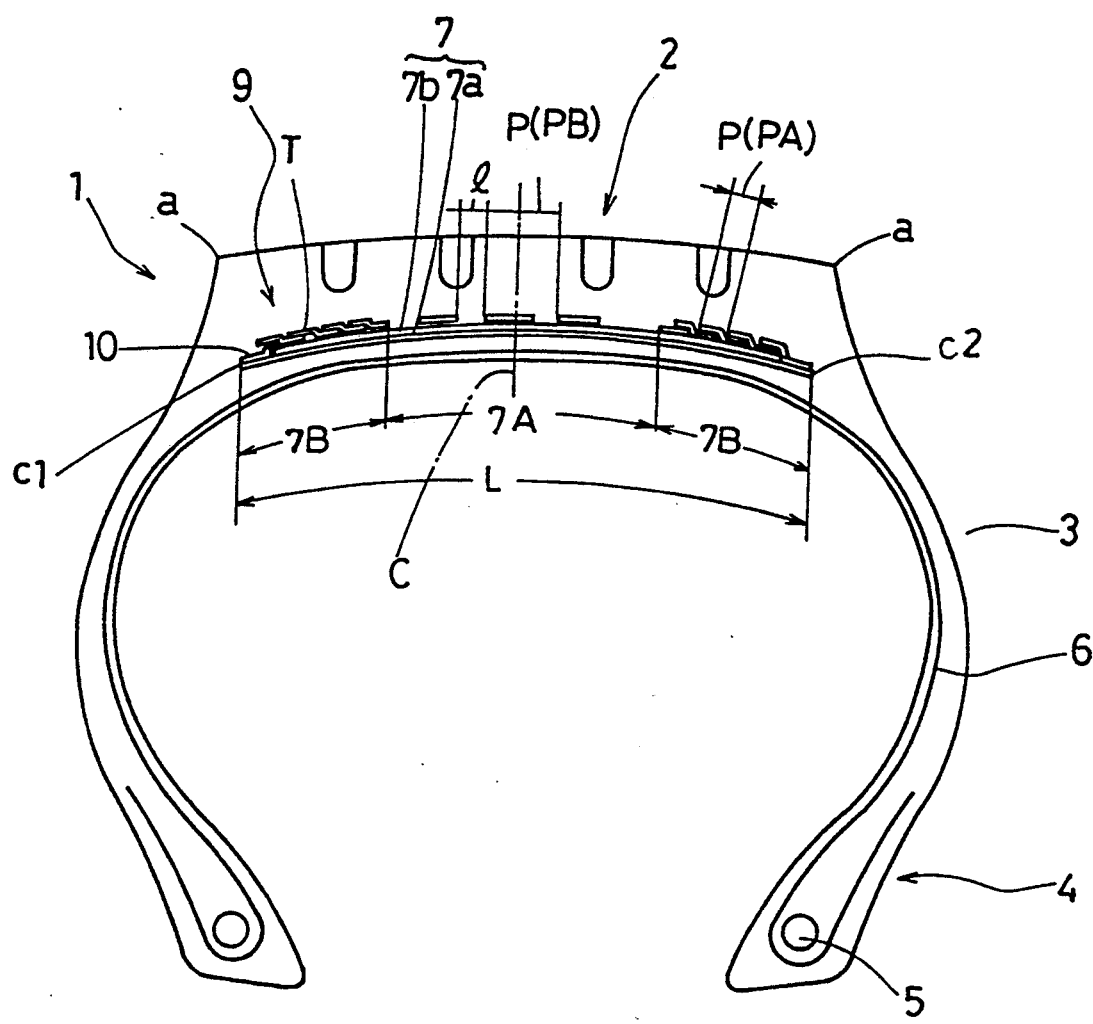
FIG. 1 is a sectional view showing an embodiment of the present invention.
Figure 2:
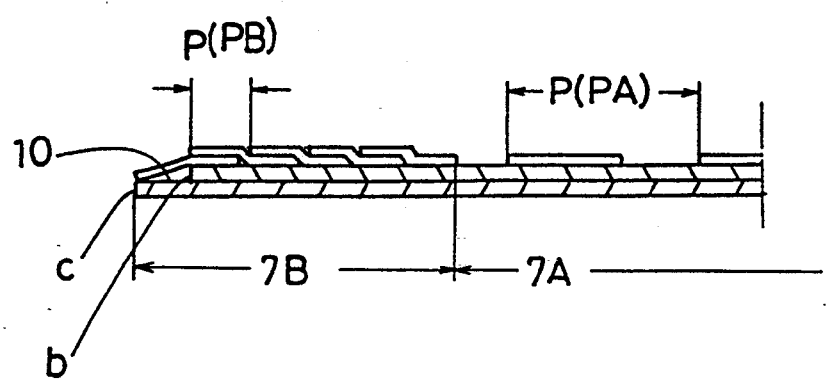
FIG. 2 is a sectional view showing the band thereof.

In FIGS. 1 and 2, radial tire 1 comprises a pair of bead cores 5 disposed one in each bead portion 4 of the tire, a carcass 6 extending between-the bead portions 4 through a tread portion 2 and sidewall portions 3 of the tire and turned up around the bead cores 5 from the inside to the outside of the tire, a tread disposed radially outside the carcass, and a belt reinforcement disposed between the carcass and the tread and composed of a breaker 7 disposed radially outside the carcass 6 and a band 9 disposed on the radially outside of the breaker 7.

The carcass 6 is composed of at least one ply of cords arranged radially at 70 to 90 degrees with respect to the tire equator.

For the carcass cords, inorganic fiber cords, e.g. steel or glass, or organic fiber cords, e.g. nylon, polyester, rayon, aromatic polyamide or the like can be used.

The breaker 7 in this embodiment is composed of two plies 7a and 7b of parallel cords. The radially inner ply 7a has an axial width generally equal to the tread width between the edges (a) of the tread 2. The radially outer ply 7b has a narrower width than the inner ply 7a. Therefore, the inner ply 7a is provided with projecting portions 10 from the edges b of the outer ply 7b to the edges c1 and c2.

The breaker plies 7a and 7b are made of high modulus cords, e.g. Steel cords, aromatic polyamide cords and the like, and the cords in each ply are arranged parallel each other and inclined at small angles with respect to tire equator C to cross the cords in the next ply, so as not to provide directional characteristics for the tire by the breaker and to improve the reinforcing effect and hooping effect of the breaker.

In the breaker, each ply is formed by a conventional method, that is, by winding a ply material having the same width as the finished ply width.

On the other hand, the band 10 is formed by winding a narrow band strip T around the breaker 7 spirally and continuously from one edge to the other edge thereof, in the figures from the left edge c1 to the right edge c2 of the inner wide ply 7a of the breaker 7.

Figure 6:
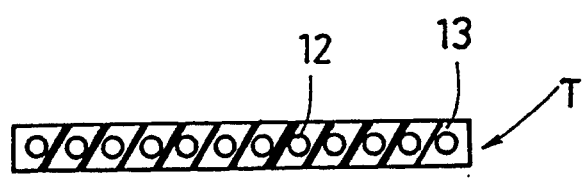
FIG. 6 is a sectional view showing a band strip.

As shown in FIG. 6, the band strip T comprises reinforcing cords 12 which are laid in parallel each other, and a topping rubber 13 in which the reinforcing cords 12 are embedded. The cords are arranged in the widthwise direction of the strip in a line and spaced by a small distance.

Figure 10:
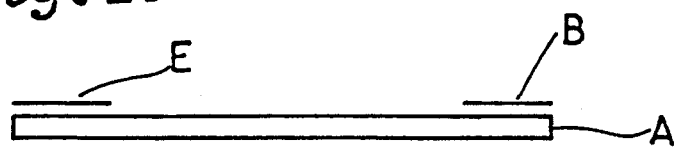
Figure 11:
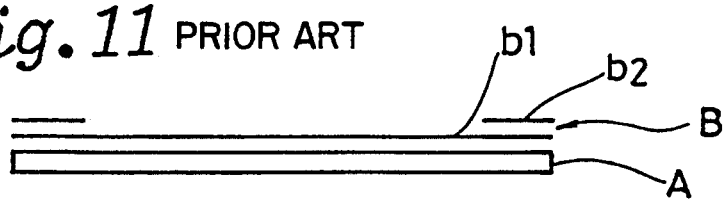

The spiral winding pitches P of the band strip T is changed between a central region 7A and side regions 7B, wherein the central region 7A is centered on the tire equator C and the width thereof is ⅓ to ⅔ times the breaker width or the axial width between the edges c1 and c2 of the inner wide ply 7a. In the central region 7A, the spiral pitches PB are such that the spaces l between the axially adjacent parts of the wound strip T are set in the range of 30 to 100 mm. In each of the side regions 7B, the spiral pitches PA are set at a substantially ½ width of the band strip width w, which pitches PA are smaller than the pitches PB in the central region, where "substantially ½ width" means w/2 plus or minus 50%. Accordingly, an edge band like in FIG. 10 is formed.

In this example, the spiral pitches P are changed only in a transitional region which is formed between the central region 7A and each of the side regions 7B.

Preferably, the band 9 covers the whole width of the side regions 7B of the breaker 7. Accordingly, at the edges c1 and c2 of the breaker, the strip T is wound along completely those edges c1 and c2, that is, the first one turn and the last one turn of the strip are made along the respective edges.

Figure 5:
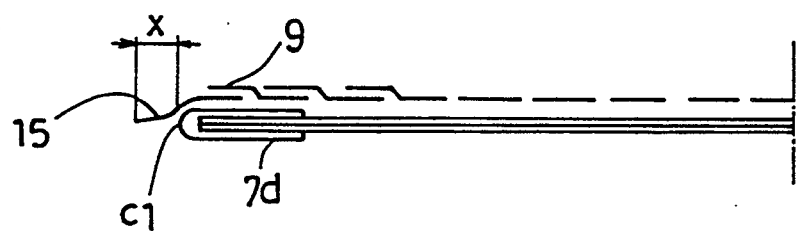

In the winding process, at the starting end and stopping end, the strip T can be protruded from the edges c1 and c2 by, for example a half strip width or the pitch PA, and the protruding portions 15 (as shown in FIG. 5) are cut off, but they may remain.

The number of the reinforcing cords in the strip T is in the range of 10 to 25, whereby the strip has a suitable width for winding work which allows a smooth change in the winding pitches. If the number is less than 10, the width w of the strip T is too small, and the winding work efficiency is poor, and further the dimensional accuracy of the band is liable to be lost. If the number is more than 25, the width w is too large, and the strip is likely to be creased in the above-mentioned transitional regions, which results in a poor working efficiency.

The width w of the strip T is in the range of 10 to 30 mm, preferably 12 to 25 mm.

Preferable, the thickness t of the strip is set in the range of 0.5 to 1.0 mm.

In order to reduce the difference in rigidity between the stiff breaker and the tread rubber, organic fiber cords having a tensile strength of not more than 100 kgf/sq.mm, for example nylon cords, polyester cords and the like are used for the reinforcing cords 12.

Especially, nylon cords which have a heat shrinking characteristic are preferably used because the hooping force of the band to the breaker 7 is increased through a tire vulcanizing process. In this case, 66-nylon cords whose cord thickness, elongation specified in 7.7 Elongation Percentage in Constant Load in JIS-L1017 Testing Methods for Chemical Fiber Tire Cords, and elastic modulus are respectively 1000d/2 to 1500d/2, 8 to 10%, and $4 \times 10^4$ to $10 \times 10^4$ kgf/sq.cm are preferably used.

Further, for the topping rubber of the strip, various rubber compounds may be usable, but a compound containing 30 to 95 parts by weight of natural rubber (NR) and 5 to 70 parts by wight of styrene-butadiene rubber (SBR) is preferably used because such compound has strength and durability against repeated deformation, and the temperature rise due to the hysteresis loss is well controlled. Two formulations for such topping rubber are given in Table 1.

|  | Ex. 1 | Ex. 2 |
| --- | --- | --- |
| NR | 70 | 50 |
| SBR | 30 | 50 |
| Carbon black | 45 (HAF) | 45 (HAF) |
| Sulfur | 3.0 | 3.0 |
| Antioxidant | 1.0 | 1.0 |
| Accelerator | 1.1 | 1.1 |
| Stearic aced | 2.0 | 2.0 |
| Zinc oxide | 5.0 | 5.0 |

Figure 3:
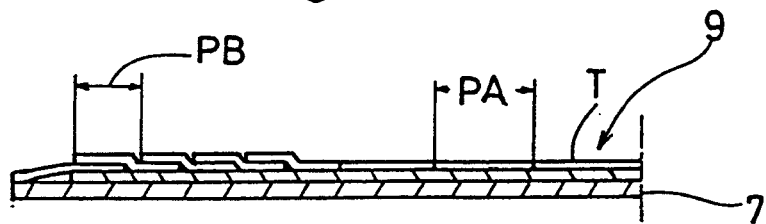
FIGS. 3–5 are sectional views each showing another example of the band.

FIG. 3 shows a modification of the band 9, in which the spiral pitches PA in the central region 7A are decreased to a value corresponding to the strip width w, while the pitches PB in the side regions 7B are remained unchanged at a half width w/2. In this case, therefore, a double layered structure is formed in the side regions 7B, and a single layer structure Is continuously formed in the central regions 7A.

Figure 4:
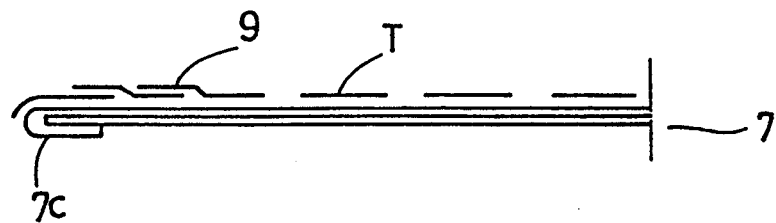

In FIGS. 1, 2 and 3, the bands 9 are combined with the breaker 7 composed of only the cut-end plies 7a and 7b of which edges are cut and left as they are. However, the band 9 can be combined with a breaker 7 including at least one fold ply 7c of which edges are folded radially outwardly or radially inwardly as shown in FIG. 4. Further, as shown in FIG. 5, it can be combined with a breaker 7 having a pair of narrow edge plies 7d which cover the edges of full width plies.

The side edges of the band 9 can be aligned with the edges c1 and c2 of breaker 7, but they can be protruded from the edges c1 and c2 by a small width x so as to form protruding portions 15 as shown in FIG. 5.

Figure 7:
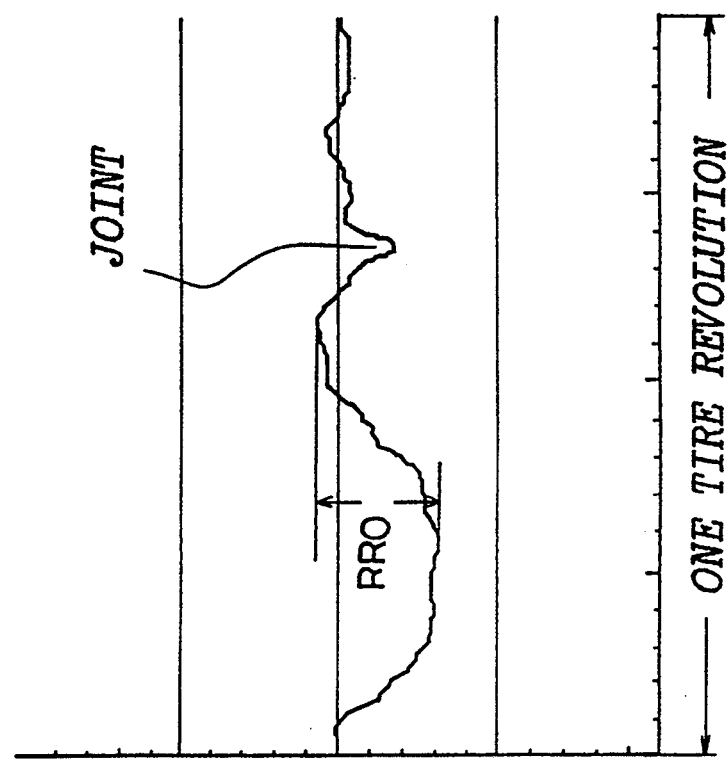
FIG. 7 is a diagram showing RRO (Radial Runout) of a tire according to the present invention.

FIG. 7 shows RRO (Radial Runout) of a P215/60R15 passenger tire according to the invention having the belt structure shown in FIG. 3. In this working example tire, fifteen nylon cords were embedded in the topping rubber, and the width of the strip is 15 mm, and the width of the central region 7A is ½ of the breaker width L.

Figure 8:
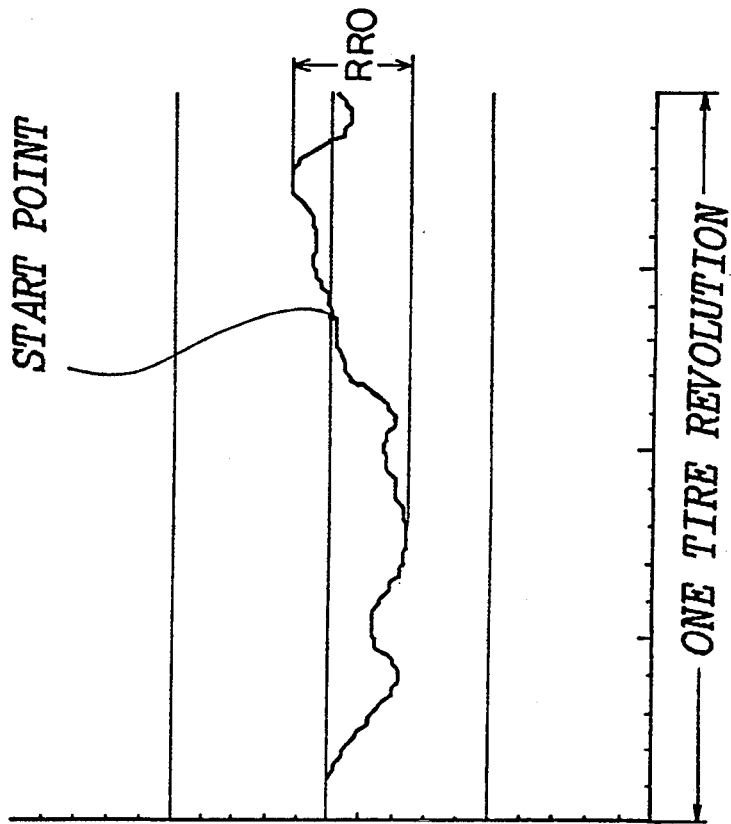
FIG. 8 is a diagram showing RRO (Radial Runout) of a conventional tire.
Figure 9:
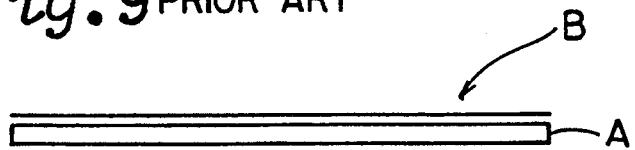
FIGS. 9–11 are sectional views showing conventional band structures.
Figure 12:
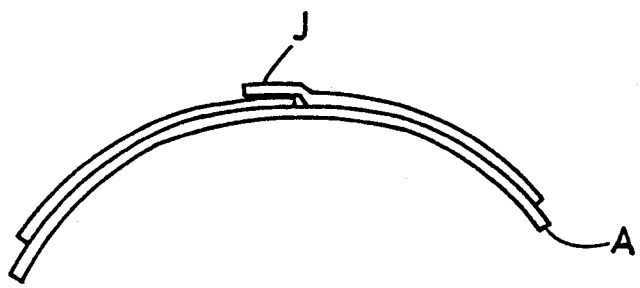
FIG. 12 is a diagram showing a joint of the belt ply in the conventional tire.
Figure 13:
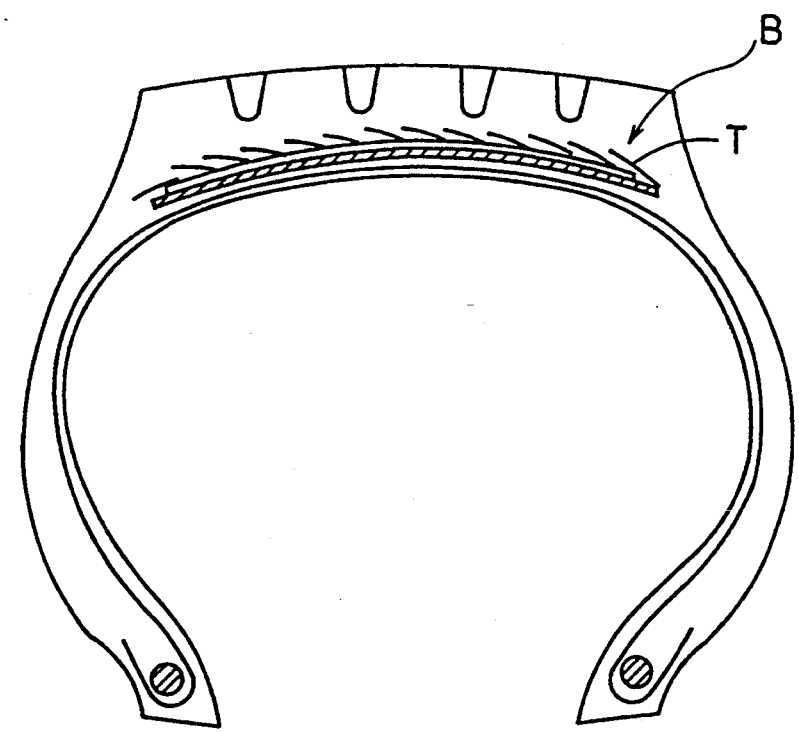
FIGS. 13–15 are sectional views showing a prior art tire.
Figure 14:
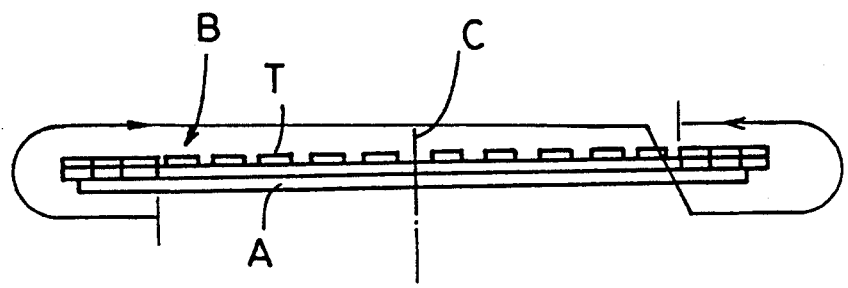
Figure 15:
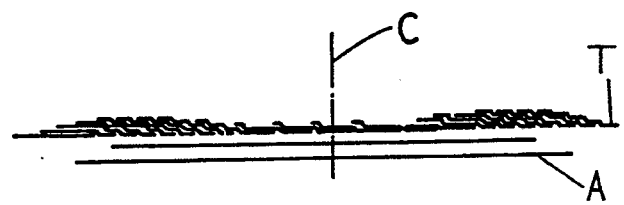
Figure 16:
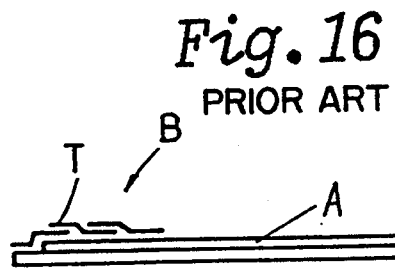
FIG. 16 is a sectional view for explaining a possible method of winding a strip.

FIG. 8 shows RRO (Radial Runout) of a reference tire having a conventional belt construction in which the band ply has an overlap joint at the circumferential ends as shown in FIG. 12.

As explained above, in the present invention, the band is formed by winding a strip spirally and continuously from one edge to the other edge of the breaker. Therefore, the thickness variation of the band in the circumferential direction of the tire is restricted only at two small points of the starting end and the stopping end of the strip, and the uniformity of the tire is improved and RRO is reduced. Further, as the winding pitches are set at a half of the strip width in the side regions, the band is provided with a double-layered structure, but in the central region the winding pitches are greater than those in the side regions. Therefore the hoop effect of the band is varied axially of the tire to be larger in the side regions than the central region.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A radial tire comprising
a carcass extending between bead portions through sidewall portions and a tread portion and having at least one ply of radially arranged cords turned up around bead cores, and
a belt disposed radially outside the carcass and inside the tread and composed of a breaker and a band,
said breaker disposed radially outside the carcass and comprising at least two plies of cords inclined with respect to the tire equator so that the cords in each ply cross the cords in the next ply,
said band disposed on the radially outside of said breaker and composed of a strip of rubberized parallel organic fiber cords which strip is wound spirally and continuously around the breaker from its one edge to the other edge, such that each side edge of said band is aligned with a respective edge of said breaker, the distance between corresponding parts of adjacent strip windings defining a winding pitch,
the number of said organic fiber cords in the strip being in the range of 10 to 25,
the winding pitches of the strip changed in the axial direction of the tire so that the pitches are greater in a central region of the breaker than in side regions thereof,
the pitches in the side regions being substantially one half of the strip width,
the width of the central region being ⅛ to ⅝ times the width of the breaker,
the pitches in the central region being such that spaces of 30 to 100 mm are formed between the axially adjacent edges of the wound strip,
the organic fiber cords in the strip being 66-nylon cords whose cord thickness and elastic modulus are 1000d/2 to 1500d/2 and $4 \times 10^4$ to $10 \times 10^4$ kgf/sq.cm, respectively, and
the topping rubber of the strip being a rubber compound containing 30 to 95 parts by weight of natural rubber and 70 to 5 parts by weight of styrene-butadiene rubber.

2. The radial tire according to claim 1, wherein the width of the strip is in the range of 10 to 30 mm.

3. The radial tire according to claim 2, wherein the width of the strip is in the range of 12 to 25 mm.

4. The radial tire according to claim 1, wherein the thickness of the strip is in the range of 0.5 to 1.0 mm.

* * * * *